March 9, 1954 — M. B. CONRAD — 2,671,466

CHECK VALVE

Filed Sept. 26, 1950

MARTIN B. CONRAD,
INVENTOR.

BY
Mellin and Hanscom
ATTORNEYS

Patented Mar. 9, 1954

2,671,466

UNITED STATES PATENT OFFICE 2,671,466

CHECK VALVE

Martin B. Conrad, Downey, Calif., assignor to Baker Oil Tools, Inc., Vernon, Calif., a corporation of California Application September 26, 1950, Serial No. 186,883

6 Claims. (Cl. 137—512.1)

The present invention relates to valve devices, and more particularly to devices of the check valve type which allow fluid flow in one direction, but preclude such flow in the reverse direction.

This invention is a continuation-in-part of my application filed jointly with Reuben C. Baker, Serial No. 172,927, filed July 10, 1950, for "Well Packer, Setting Apparatus and Dump Bailer."

An object of the present invention is to provide check valves of simple and inexpensive construction, capable of sealing efficiently and of holding relatively high pressures.

Another object of the invention is to provide a check valve capable of handling fluid at a comparatively high rate, but which, nevertheless, employs a minimum number of parts for effectively preventing return flow of fluid.

A further object of the invention is to provide a check valve device embodying a pliant, elastic valve element for preventing return flow of fluids through the valve device, the valve element being prevented from cold flowing into the fluid passage or passages of the device upon being subjected to high pressure or temperature conditions, or both.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings.

Figure 1:
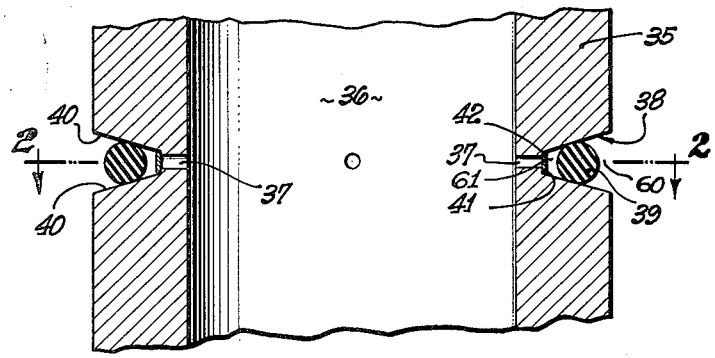
Figure 1 is a longitudinal section through a portion of the valve device embodying the invention.
Figure 3:
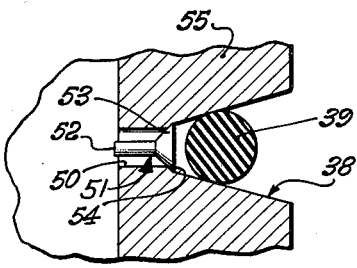
Fig. 3 is a longitudinal fragmentary section of another embodiment of the invention.
Figure 2:
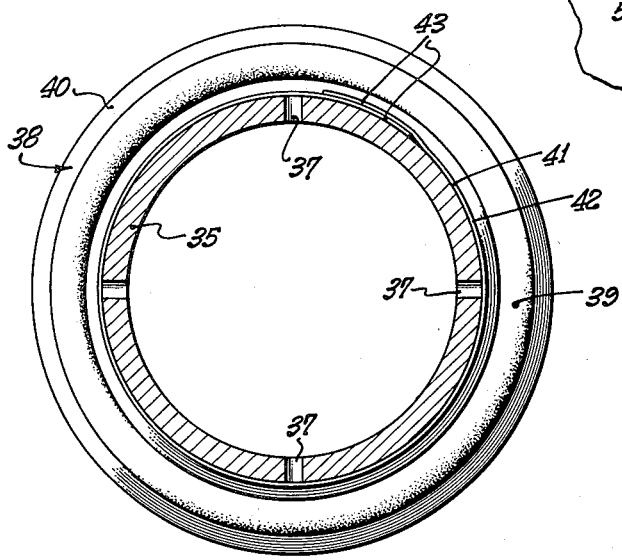
Fig. 2 is a cross-section taken along the line 2—2 on Fig. 1.

As disclosed in Figs. 1, 2 and 3 of the drawings, it is desired to allow flow of fluid in one direction from the inlet 36 of a valve body 35 to its outlet 60, but to automatically preclude return or reverse flow of the fluid. Thus, the fluid may pass from the inlet 36 through one or more lateral passages or ports 37 in the valve body into the inlet portion 61 of a peripheral or circumferential groove 38 in the body. Such fluid may displace a valve member 39 from its path, and continue flowing into the outlet portion 60 of the groove.

The valve element 39 is in the form of a pliant, elastic ring, that may be made of natural or synthetic rubber, or rubber-like material. Such element 39 is disposed in the circumferential groove 38, and is adapted to simultaneously engage the tapered side walls 40 of this groove. Such side walls taper toward each other in an inward direction toward the axis of the valve body 35. The valve element 39 is preferably round in cross-section, constituting a rubber or rubber-like O ring, having an unrestrained cross-sectional diameter that is greater than the distance between the tapered side walls 40 adjacent the ports 37, but substantially less than the distance between the side walls at the large or outlet portion 60 of the peripheral groove. The unconfined diameter of the ring is such that, when stretched and placed in the groove, it tends to contract inherently into snug sealing engagement with the opposed tapered side walls 40 of the body groove, and effects a leak proof seal with such side walls, preventing return flow of fluid from the exterior of the apparatus back through the lateral passage or ports 37 to the inlet 36.

When the internal pressure within the valve body exceeds the external pressure by an amount sufficient to overcome the inherent contractibility of the valve element 39, such fluid pressure will exert an outwardly directed force upon the valve element, expanding and shifting it in an outward direction toward the enlarged portion 60 of the circumferential groove 38, and out of contact with the tapered side walls 40 of the groove, allowing fluid to flow from the ports 37 into the narrow inlet 61 of the peripheral groove 38, around the O ring 39, and into the larger outlet portion 60 of the groove. When the pressure within the inlet 36 is relieved, the valve element 39 contracts inherently into snug sealing engagement with the tapered side walls 40, and prevents any fluid externally of the valve device from passing back through the circumferential groove 38 into the lateral passages or ports 37. As the external pressure is increased, the valve element 39 is merely wedged more securely by such pressure into the narrow portion 61 of the tapered groove, which increases the sealing effectiveness of the valve element against the side walls 40 of the groove. It is to be noted that the valve element is preferably always spaced outwardly from the base 41 of the groove; so as not to interfere with its wedging action against the tapered side walls.

Under certain conditions of operation, the valve element 39 may be subjected to exceedingly high unit pressures and high temperatures, of the order, for example, of 5,000 to 10,000 p. s. i. and 300 degs. F. Under these conditions, the rubber ring 39 may become exceedingly plastic and somewhat liquid, and may be forced into the lateral body ports 37. There is also the possibility of the rubber cold flowing through these ports to such an extent that the ring becomes dissipated and is no longer available for performing its sealing function against the tapered side walls of the body groove. When such extreme conditions are encountered, cold flowing may be prevented by use of the expedients disclosed in the drawings.

In order to prevent cold flowing of the rubber element 39 into or through the body ports 37, the base 41 of the groove 38 may be encompassed by a flat, metallic, spring-like member 42 having overlapping ends 43. The member 42 contracts inherently into snug engagement with the base 41 of the groove, forming a barrier or bridge between the pliant, elastic seal ring 39 and the body ports 37. This metallic spring member 42 is expanded outwardly by fluid pressure internally of the body and in the ports 37, being shifted away from the base 41 of the groove, in order to allow the fluid to flow around the spring 42, to expand the elastic sealing element 39, and flow around the latter into the outlet portion of the groove 38. In the event that the ring 39 is subjected to a high back pressure, the ring will be contracted and wedged by such pressure against the side walls of the groove 38. However, the ring cannot be forced by the high pressure and temperature condition, to which it is subjected, into the ports 37 since the flat, metallic spring ring member 42 is disposed over the ports, and, therefore, allows no opening to be present into, or through, which the rubber seal ring material may flow.

Thus, it is apparent that the port bridging device 42 disclosed in Figs. 1 and 2 does not interfere with normal functioning of the check valve 39, but it does prevent cold flowing of the check valve into or through the body ports 37 under conditions of extreme pressure and temperature. For that matter, the spring may snugly engage the base 41 of the groove and form a supplemental seal, preventing reverse flow of fluid through the valve body.

In the form of cold flow preventing device shown in Fig. 3, each port 50 may have a metallic valve element 51 disposed in it, this element having a central shank 52 of substantially less diameter than the diameter of the port 50, and being provided with a tapered valve head 53 adapted to engage a companion valve seat 54 in the outer portion of the port 50.

Pressure within the valve body 55 will urge the metallic valve element 51 outwardly, removing it from its seat 54, and allowing the fluid to expand the elastic seal ring element 39, flowing around the latter into the enlarged outlet portion of the circumferential groove 38. Return flow of fluid is prevented by the contraction of the ring 39 into snug sealing engagement with the tapered side walls of the groove. If the back pressure becomes exceedingly high, the ring 39 may be forced against the metallic check valve elements 51, each of which bridges a port 50, closing the latter against passage thereinto of the seal ring, and thereby preventing cold flow and dissipation of the latter into or through the ports 50.

Here again, as in the form of invention disclosed in Figs. 1 and 2, each metallic port bridging element 51 may form a supplemental check valve, precluding reverse flow of fluids into the valve body.

The inventor claims:

1. In a valve: a valve body having an opening and a circumferential groove communicable with said opening; said groove being defined by opposed side walls, one of which tapers toward the other wall; an elastic seal ring in said groove movable into sealing engagement with said side walls; and means normally spaced from said ring and disposed between said ring and opening in sealing engagement with said body to prevent fluid flow from said groove into said opening and to prevent substantial movement of said ring into said opening.

2. In a valve: a valve body having an opening and a circumferential groove communicable with said opening; said groove being defined by opposed side walls, one of which tapers toward the other wall; an endless elastic seal ring in said groove movable inherently into sealing engagement with said side walls; and a metallic spring member in said groove between said ring and opening closing said opening against passage of said ring thereinto, said spring member being separate from said elastic seal ring.

3. In a valve: a valve body having an opening and a circumferential groove defined by opposed side walls tapering toward each other and a base through which said opening extends into communication with said groove; an endless elastic seal ring in said groove movable inherently into sealing engagement with said side walls; and a metallic spring annulus in said groove movable inherently into engagement with said base to bridge and close said opening, said spring annulus being separate from said elastic seal ring.

4. In a valve: a valve body having a circumferential groove and a lateral opening disposed inwardly of and communicable with said groove; said groove being defined by a base and by opposed side walls tapering inwardly toward each other and toward said base; an endless elastic seal ring in said groove contractible inherently into sealing engagement with said side walls; and a metallic spring annulus in said groove contractible inherently into sealing engagement with said base and disposed across said opening, said spring annulus being separate from said elastic seal ring.

5. In a valve: a valve body having an opening and a circumferential groove communicable with said opening; said groove being defined by opposed side walls, one of which tapers toward the other wall; an endless elastic seal ring in said groove movable inherently into sealing engagement with said side walls; and a metallic spring member in said groove extending circumferentially completely around said groove between said ring and opening and sealingly engaging said body to prevent fluid leakage from said groove into said opening and to prevent passage of said ring into said opening, said spring member being separate from said elastic seal ring.

6. In a valve: a valve body having an opening and a circumferential groove communicable with said opening; said groove being defined by opposed side walls, one of which tapers toward the other wall; an elastic seal ring in said groove movable inherently into sealing engagement with said side walls; and a metallic spring member in said groove extending circumferentially completely around said groove between said ring and opening and sealingly engaging said body to prevent fluid leakage from said groove into said opening and to prevent passage of said ring into said opening; said spring member being normally spaced from said elastic seal ring to avoid interference with the sealing engagement of said ring with said side wall.

MARTIN B. CONRAD.

References Cited in the file of this patent

UNITED STATES PATENTS

| Number | Name | Date |
|---|---|---|
| 145,964 | Nichols | Dec. 30, 1873 |
| 167,604 | Chisholm | Sept. 14, 1875 |
| 881,234 | Pusch | Mar. 10, 1908 |
| 1,196,920 | Astrom | Sept. 5, 1916 |
| 1,938,218 | Dempsey | Dec. 5, 1933 |
| 2,313,284 | Valentine | Mar. 9, 1943 |
| 2,505,949 | Vilbiss | May 2, 1950 |

FOREIGN PATENTS

| Number | Country | Date |
|---|---|---|
| 34 | Denmark | of 1894 |
| 38,601 | Sweden | of 1915 |
| 96,811 | France | of 1872 |
| 167,151 | Germany | of 1906 |